United States Patent [19]

Milton

[11] 4,002,898
[45] Jan. 11, 1977

[54] SINGLE MODE LASER MULTITERMINAL OPTICAL DATA COMMUNICATION SYSTEM

[75] Inventor: A. Fenner Milton, Washington, D.C.

[73] Assignee: The United States of America as represented by the Secretary of the Navy, Washington, D.C.

[22] Filed: Jan. 26, 1976

[21] Appl. No.: 652,253

[52] U.S. Cl. .............................................. 250/199
[51] Int. Cl.² .......................................... H04B 9/00
[58] Field of Search ................................... 250/199

[56] References Cited
UNITED STATES PATENTS 1,981,999  11/1934  French ............................ 250/199
3,953,727  4/1976  d'Auria ............................ 250/199

Primary Examiner—Richard Murray
Attorney, Agent, or Firm—R. S. Sciascia; Philip Schneider; Melvin L. Crane

[57] ABSTRACT

A multiterminal single mode communication system using single mode fibers and a single centrally located laser source. An electro-optical switch at the terminal switches pulses of light from the communication channel to a distribution channel comprising a single mode fiber. Information is switched on by an electrical modulator which controls the light switching of the switches and information is taken off by light detectors.

3 Claims, 3 Drawing Figures

SINGLE MODE LASER MULTITERMINAL OPTICAL DATA COMMUNICATION SYSTEM

BACKGROUND OF THE INVENTION

This invention relates to optical communication systems and more particularly to an optical communication system using single mode optical fibers and a single centrally located laser source.

Heretofore optical communication systems have used multiterminal optical data transmission lines using multimode optical fibers and light emitting diodes. A prior art U.S. Pat. No. 1,981,999 sets forth an optical telephone system for transmitting optical radiation from one place to another through suitable optics and a light cable.

SUMMARY OF THE INVENTION

This invention makes use of a laser in combination with single mode optical fibers to transmit light over a distribution channel and information over a communication channel. The light is transferred from the distribution channel to the communication channel to add information by use of high speed integrated optics four port control switches.

DETAILED DESCRIPTION

Figure 1:
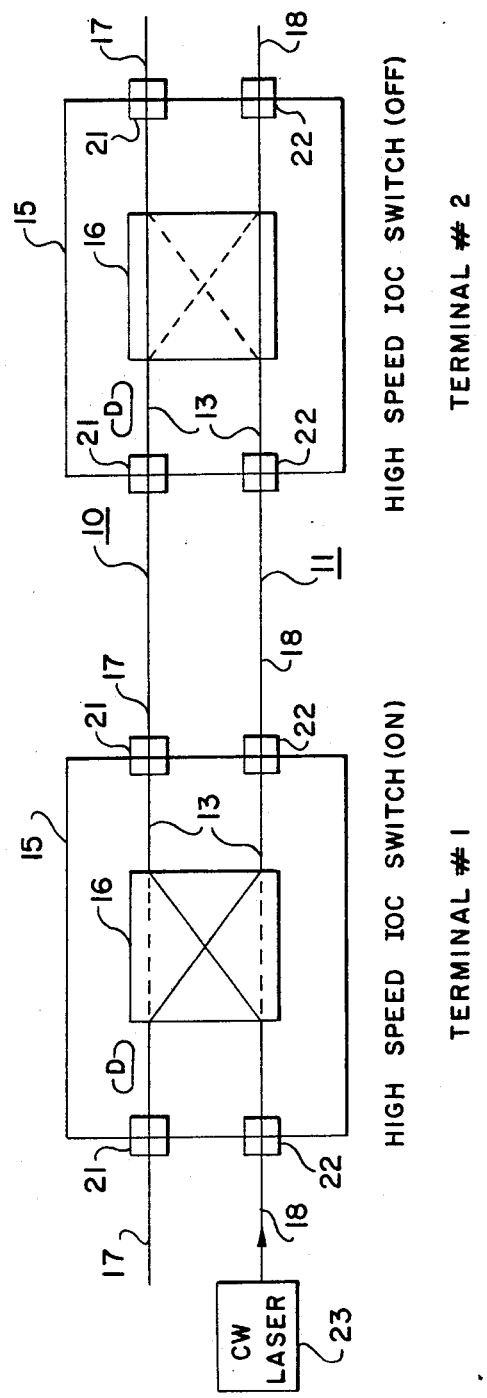
FIG. 1 illustrates a schematic of a partial multiterminal communication system with single mode fibers and one laser element.

Now referring to the drawing there is shown for illustrative purposes adjacent communication and distribution channel 10, 11 coupled together by an electrical optical switch such as disclosed in an article "A New Waveguide Switch/Modulator For Integrated Optics" by W. E. Martin, Applied Physics Letters, Vol. 26, No. 10, May 15, 1975, p. 562. The optical switch is constructed by using thin film dielectric waveguides 13, fabricated in an electrooptic substrate 15 with the waveguide constituting a material having an index of refraction which is greater than the substrate. Four single mode fiber optic-elements 17, 18 are secured to the ends of the waveguide switches by suitable optical coupler elements 21, 22. The optical coupler elements 21, 22 extend around the end of the fibers and into the thin film waveguide of the optical switch so that there will be no loss of radiation on coupling radiation onto and from the switches. The optical waveguides are connected close enough together so that radiation may be directed from one fiber element to the other by use of the switch during application of an electrical voltage. If there is no voltage applied, the optical radiation passes through the switch in a straight through line as noted by the solid line in terminal No. 2 as if the switch is a continuation of the fiber. If an electrical voltage is applied each terminal extracts information from the communication channel by use of pickoff couplers as noted by the solid lines in terminal No. 1. One advantage for the described system is: a single continuous wave laser 23 may be used for the light radiation.

Figure 2:
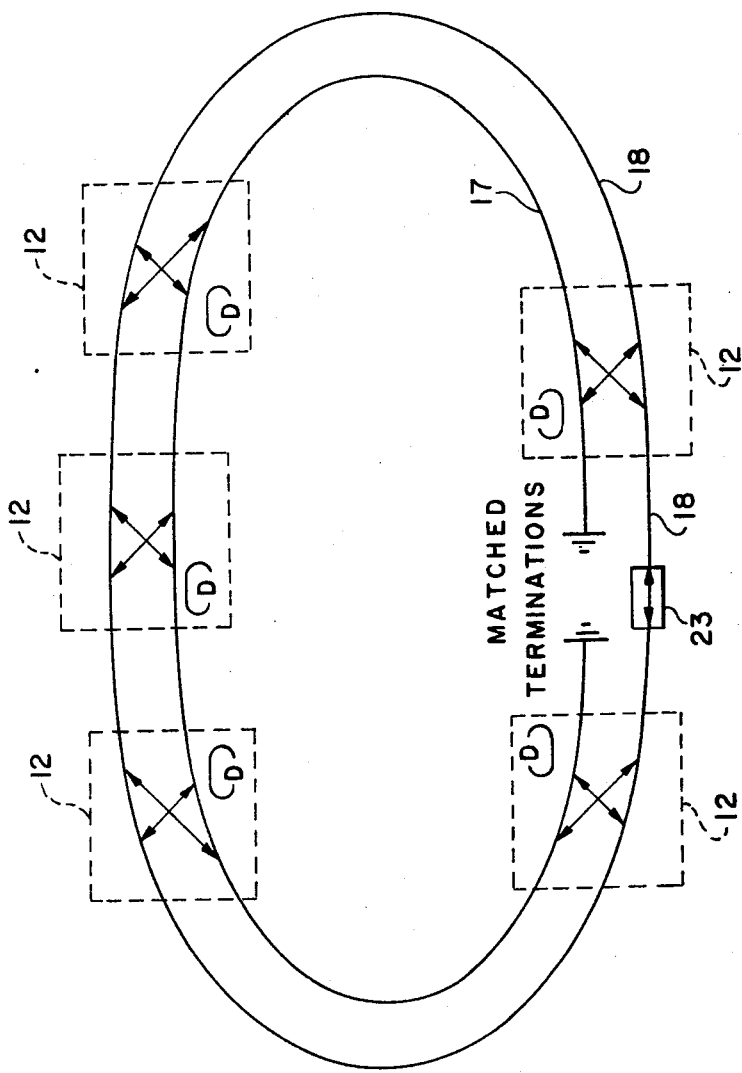
FIG. 2 illustrates a schematic of a simple complete communication system.

FIG. 2 illustrates a complete communication system including several switching and pickoff terminals as described in FIG. 1. The system may be made with more or less stations depending on the needs. The system may be made in a loop as shown in FIG. 2 or with two one way lines as shown in FIG. 1 or with the configuration shown in FIG. 3 where all the information passes through a central repeater terminal before being sent out to other terminals.

In FIG. 2, the crossed arrows represent the light switching elements and the D represents the detectors at each switch.

In operation a continuous wave laser is excited to produce a laser beam which is directed into the end of the optical fiber 18 of the distribution channel. The single laser element provides optical radiation for the entire system; therefore, each station does not need its own light source. The laser light is switched at each station from the distribution channel to the communication channel and information may be taken off the communication channel or added to the system at each station.

Instead of making the system with two separate single optical fiber lines, the system may be made with a two mode fiber which will be operated in the same manner as two single fiber lines or the switches may be used to interrupt light traveling down a single communication channel.

Figure 3:
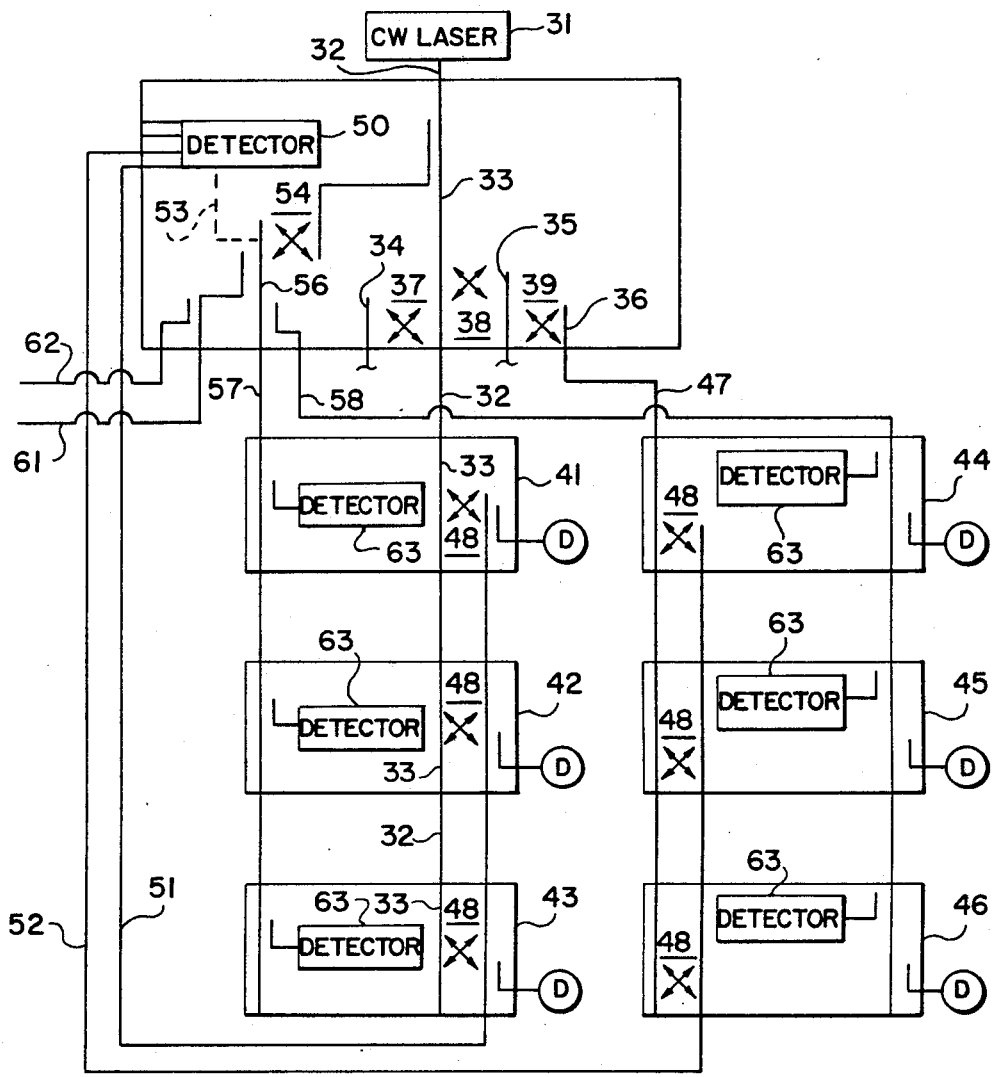
FIG. 3 illustrates a schematic of a single mode single laser data bus with repeater.

FIG. 3 illustrates a single mode data bus T-star configuration with a single laser source 31. The single laser source provides light over a single light conducting waveguide-fiber line 32, 33. The light may be distributed into different distribution channels 34, 35, 36 by light switches 37, 38, and 39. Light is shown conducted to 6 different stations 41–46 through fiber lines 32 and 47. Information may be added to the lines by electrooptic switches 48 at each different station and conducted to a central repeater terminal 50 through fiber optic lines 51 and 52. Light is taken off the main line by switches 37, 38 and 39 and distributed to different stations if desired. As shown, switch 38 switches light onto waveguide 35 and switch 39 switches light onto waveguide 36 and then out on fiber optic 47 to stations 44–46. Light is switched off line 47 by switches 48 at the different stations where information may be added and sent out over line 52 to the central repeater terminal. Likewise light may be switched from stations 41–43 onto line 52 which conducts the information to the central repeater terminal. The light at the central repeater terminal is converted into electrical output signals and sent out over dotted line 53 to the control switch 54. Control switch switches light from input waveguide 55 to the communication line 56 in accordance with the information fed into switch 54. The communication information is then sent out over other desired communication lines 57, 58 to stations 41–43 and 44–46, respectfully. Communication lines 61 and 62 may transmit communication data to other such stations. The data is then taken off at the desired station by detectors 63. Detectors may be used at each station also.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical communication system which includes in combination:

a plurality of terminals optically connected with each other by a single fiber communication line and a single fiber distribution line;
each of said terminals including a communication channel optical waveguide and a distribution channel optical waveguide with said distribution channel optical waveguide optically connected with said single fiber distribution line and said communication channel optical waveguide optically connected with said single fiber communication line;
a continuous wave laser for producing a light beam;
a single mode optical fiber interconnecting said laser light output with said distribution channel of one terminal; and
a light detector at each terminal for detecting light on said communication channel thereby receiving any information on the communication channel.

2. An optical communication system as claimed in claim 1 wherein;
each terminal includes an electro-optic coupler for coupling optical radiation from said distribution channel to said communication channel and from said communication channel to said distribution channel.

3. An optical communication system as claimed in claim 2 which includes:
a laser light distribution optical waveguide coupler panel for distributing laser light from a single source to a plurality of different distribution channels each of which include a plurality of different terminals, and
a repeater detector for all of said different distribution channels.

* * * * *